United States Patent [19]

Ohtaka

[11] 4,443,088

[45] Apr. 17, 1984

[54] FOCUSING SCREEN

[75] Inventor: Keiji Ohtaka, Tokyo, Japan

[73] Assignee: Canon Kabushiki Kaisha, Tokyo, Japan

[21] Appl. No.: 320,704

[22] Filed: Nov. 12, 1981

[30] Foreign Application Priority Data

Nov. 25, 1980 [JP] Japan .................................. 55-165557

[51] Int. Cl.³ .......................... G02B 5/04; G03B 13/28
[52] U.S. Cl. ...................................... 354/200; 350/286
[58] Field of Search .......... 354/199, 200, 201, 219 IF; 350/286

[56] References Cited

U.S. PATENT DOCUMENTS

| | | |
|---|---|---|
| 2,881,686 | 4/1959 | Rühle . |
| 3,004,470 | 10/1961 | Rühle ............................. 354/199 X |
| 4,003,637 | 1/1977 | Masuaka ........................... 354/200 X |
| 4,338,012 | 7/1982 | Matsumura et al. ................. 354/200 |

FOREIGN PATENT DOCUMENTS

| | | |
|---|---|---|
| 1003567 | 2/1957 | Fed. Rep. of Germany ...... 354/200 |
| 1157316 | 12/1957 | France . |
| 961003 | 6/1964 | United Kingdom . |

*Primary Examiner*—Donald A. Griffin
*Attorney, Agent, or Firm*—Fitzpatrick, Cella, Harper & Scinto

[57] ABSTRACT

A focusing screen includes a plurality of light deflecting portions, each of which includes a prism component having a light deflecting function for providing part of an out-of-focus image with displacement in one direction, and a diffraction grating component formed on the prism component and having a plurality of unit structures. At least a portion of each of the unit structures is formed by a curved surface.

4 Claims, 11 Drawing Figures

FOCUSING SCREEN

BACKGROUND OF THE INVENTION

1. Field of the Invention

This invention relates to a focusing screen adapted to be mounted in the optical viewing path of a camera.

2. Description of the Prior Art

Cameras of the single lens reflex type and also of the range finder type generally include a focus indicating system utilizing an image splitting bi-prism. This focus indicating system usually comprises a focusing screen having a focus indicating part disposed in the center of the real image plane of the range finder and comprising image splitting prisms.

The focus indicating system of such a split-image type, as compared with other systems, has a good focusing accuracy, but suffers from a phenomenon that the focus indicating part dark-changes for an interchangeable lens having a great F-number, namely, low in brightness.

As the aperture ratio of the lens is decreased, the image splitting bi-prism has increasingly larger dark areas. Accordingly, the focusing becomes more difficult with the increasing of the F-number of the lens.

This focus indicating accuracy and the dark of the focus indicating part have a relation contrary to each other (inversely proportional to each other) for the vertical angle of the image splitting prism. This contrary relation is attributable to the fact that, among the light beams from the exit pupil of the lens, only the light beam having a particular angle of incidence determined by the vertical angle of the image splitting prism passes through the range finder and reaches the eye of the observer and contributes to the focus indicating. That is, if the vertical angle of the splitting prism is increased, the light rays from the marginal portion of the exit pupil of the phototaking lens can be directed to the eye-piece of the view finder and thus, the focus indicating accuracy is enhanced. However, a splitting prism having a great vertical angle has its focus indicating part dark-changeable even for an interchangeable lens which is a little dark, namely, which has a great F-number, and thus, the focus indicating becomes impossible.

Conversely, if the vertical angle of the prism is made small, the focus indicating accuracy is reduced but the focus indicating is possible even for an interchangeable lens which has a great F-number, namely, which is considerably dark.

To overcome such phenomenon, the vertical angle of the image splitting prism usually is not rendered to so great a value but is minimized to an angle in the vicinity of 8° so that, even if the focus indicating accuracy is sacrificed to some extent, the focus indicating becomes possible even for a dark interchangeable lens having an F-number of the order of 4.5–5.6.

However, for interchangeable lenses of a smaller maximum aperture ratio, for example f/8 and larger, the forementioned problem of dark prism is again presented.

U.S. Pat. No. 2,881,686 shows a focusing screen having a circular Fresnel lens formed on its upper surface. However, this Fresnel lens does not contribute to the focus indicating function.

British Pat. No. 961,033 and French Pat. No. 1,157,316 show a focusing screen having a Fresnel-like split-image bi-prism. However, there is no disclosure in these references of the advantage of facilitating the range finding operation by the use of image blurring and also of alleviating darkening.

U.S. Pat. No. 4,003,637 discloses a focusing screen comprised of microprisms, but again in this reference, there is no disclosure of a technique for solving the above-noted problem.

A focusing screen overcoming the above-described technical disadvantages has already been proposed in U.S. Application Ser. No. 204,009, now U.S. Pat. No. 4,338,012, which issued July 6, 1982, filed by the assignee of the present invention. The present invention is an improvement over such a focusing screen.

SUMMARY OF THE INVENTION

An object of the present invention is to provide a novel and improved focusing screen.

Another object of the present invention is to provide a focusing screen which enables a focus condition to be easily detected.

Still another object of the present invention is to provide a focusing screen in which, even if the angle of divergence of an incident light beam for forming an image on the focusing screen is reduced, darkening of the focus indicating part does not sharply occur and focus indication is possible in a wide range of F-number.

The invention will become fully apparent from the following detailed description thereof taken in conjunction with the accompanying drawings.

DESCRIPTION OF THE PREFERRED EMBODIMENTS

Figure 1:
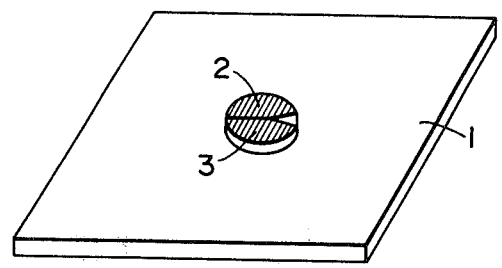
FIGS. 1, 2, 3, 4A, 4B, 4C and 4D illustrate the prior art.

Description will first be made of the prior art focusing screen disclosed in the aforementioned U.S. Application Ser. No. 204,009, now U.S. Pat. No. 4,338,012. The construction and operation of this focusing screen are described in detail in the specification of said application and, as shown in FIG. 1, a focus indicating part comprising light deflecting portions 2 and 3 is provided at the center of the focusing screen 1.

Figure 2:
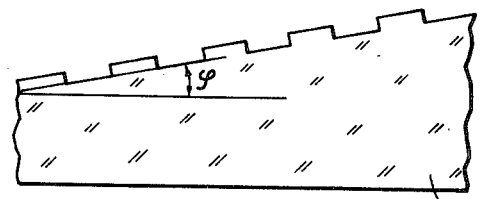
Figure 3:
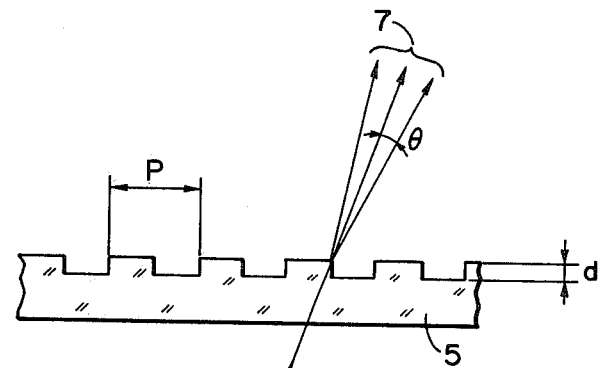
Figure 3:
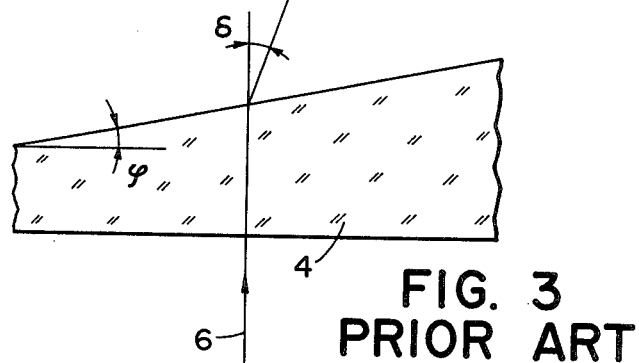

Each light deflecting portion of this focus indicating part, as shown in the cross-sectional view of FIG. 2, comprises a rectangular phase diffraction grating formed on the surface of a split-image type prism for refracting an incident light. That is, this light deflecting portion, as shown in the functionally analytical view of FIG. 3, has a construction comprising a combination of a prism portion 4 having the function of deflecting by $\delta$ a light 6 incident thereon from an object through a phototaking lens and a diffraction grating structure portion 5 of pitch P having the function of diffracting the incident light.

Figure 4A:
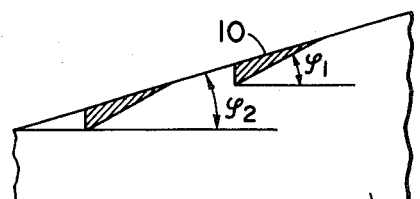
Figure 4B:
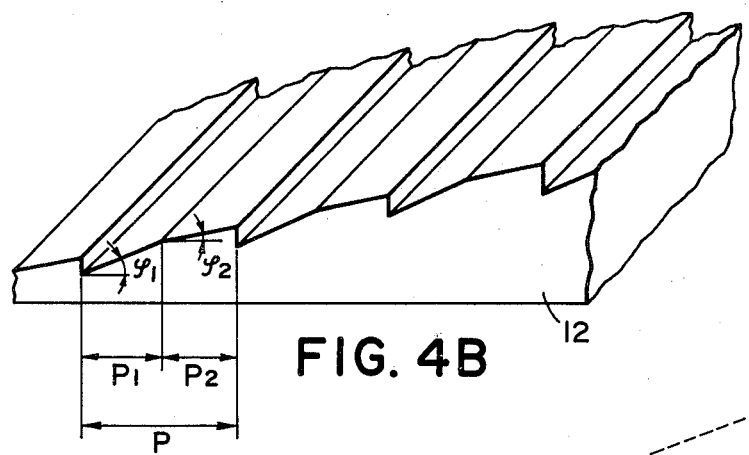
Figure 4C:
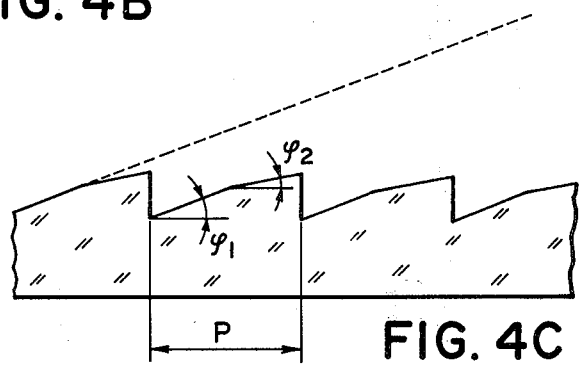
Figure 4D:
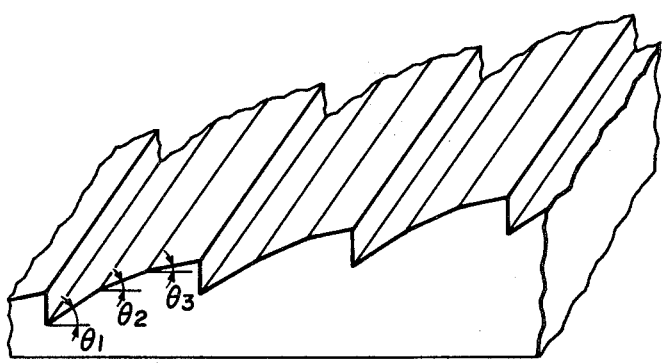

A similar effect may also be obtained when a focus indicating part is constructed by combining a light deflecting portion 12 as shown in FIGS. 4A and 4B which is obtained by forming a unit structure having two prism vertical angles $\phi_1$ and $\phi_2$ resulting from forming finer cuts 10 of a diffraction grating on a prism with another light deflecting portion of identical construction in opposed relationship with the latter. It is further disclosed in the aforementioned patent application that, as shown in FIG. 4C, a prism having a refracting action for forming a split image may be replaced with a Fresnel-like prism having a pitch equal to the pitch P of the unit structure of the diffraction grating. According to the focus indicating part of the construction shown in FIG. 4C, during out-of-focus, in addition to the lateral deviation of upper and lower images similar to that in an ordinary split-image prism, laterally deviated images are further separated into dual images correspondingly to the prism vertical angles $\phi_1$ and $\phi_2$ by the diffracting action to facilitate the focus indication and also, as regards darkening, it occurs in two stages from a portion corresponding to greater one of the two vertical angles $\phi_1$ and $\phi_2$ and therefore, this may be said to be improved over the conventional split-image prism. As a developed form of the focus indicating part in this form, it has also been devised to construct the unit structure of the diffraction grating by three or more minute prism portions having different vertical angles, as shown in FIG. 4D.

The present invention contemplates further improvements in the focusing screen having the novel focus indicating part as described above.

Figure 5:
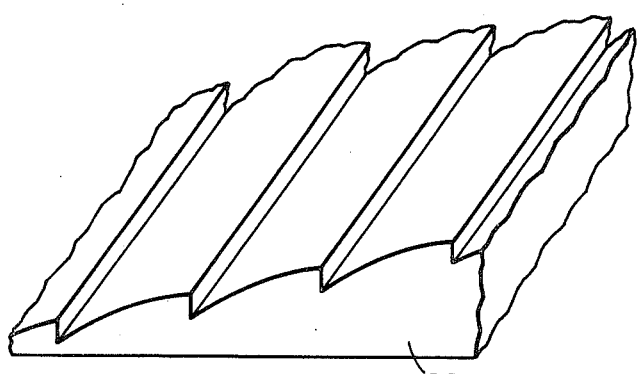
FIG. 5 is an enlarged perspective view of a portion of the focusing screen according to a first embodiment of the present invention.

FIG. 5 is a schematic perspective view of a light deflecting portion 22 forming the focus indicating part of a focusing screen which is a first embodiment of the present invention.

In this embodiment, a phase type diffraction grating structure having unit structures each formed by a smooth curved surface is provided on a prism for forming a split image. Accordingly, the cross-section of the diffraction grating is a smooth curve.

Forming at least a portion of the unit structures of the diffraction grating by a smooth curved surface and making the cross-sectional shape of the light deflecting portion 22 into such a curved shape, as in the present embodiment, results in the following advantages. First, during out-of-focus, lateral deviation of upper and lower images, namely, image split, occurs as in the conventional example, but in the focus indicating part of the focusing screen of the present embodiment, the laterally deviated images become approximate to purer blurred images and, where the pitch of the diffraction grating is fine, color separation by the diffracting action is involved. Also, the darkening caused by the stop-down of an objective lens continuously occurs from a surface portion whose inclination is sharp relative to the focus plane, namely, a portion in which the inclination of the tangential line on the curve of the cross-section of the light deflecting portion relative to a plane perpendicular to the optical axis is great and therefore, in the focus indicating part using the light deflecting portion of FIG. 5, focus indication is possible over a wide range of F-number.

The curved shape of the cross-section of the light deflecting portion may be a factor which determines the blurred condition of the aforementioned images and the range of usable F-number and therefore, an optimal curved shape of such cross-section can be selected in a camera, an optical system or the like with which the focusing screen according to the present invention is used.

Figure 6:
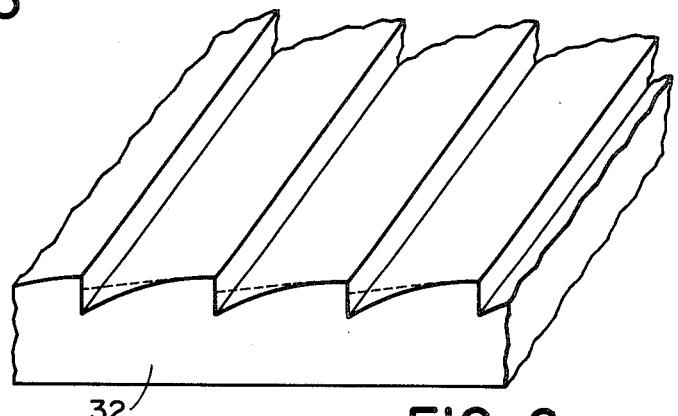
FIG. 6 is an enlarged perspective view of a portion of the focusing screen according to a second embodiment of the present invention.

Also, in the embodiment shown in FIG. 5, the prism portion forming the base on which the diffraction grating is provided can be made into a Fresnel-like prism as required. In this case, the pitch thereof should preferably be integer times (including one time) the pitch of the unit structures of the diffraction grating. FIG. 6 shows an embodiment using a one-time Fresnel-like prism.

Figure 7:
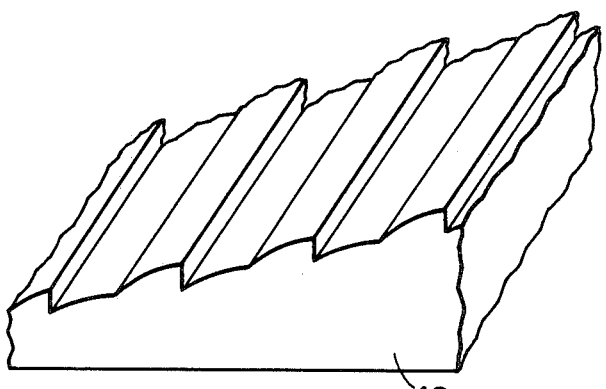
FIG. 7 is an enlarged perspective view of a portion of the focusing screen according to a third embodiment of the present invention.
Figure 8:
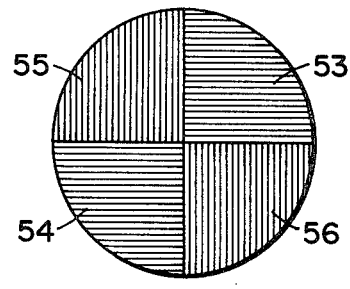
FIG. 8 is a plan view of the focusing screen according to a fourth embodiment of the present invention.

The present invention also includes an embodiment as shown in FIG. 7 wherein the cross-sectional shape of the diffraction grating comprises two or more kinds of smooth curves. On the other hand, the present invention is applicable not only to the above-described vertically split image prisms but also to a split-image prism of the type in which vertically and horizontally deviated images are created. FIG. 8 is a plan view of only the focus indicating part, in which reference numerals 55 and 56 designate focus indicating parts causing lateral deviation of images in the horizontal direction and having a cross-sectional shape similar to what has previously been described and in these focus indicating parts, grating lines of the diffraction grating are formed in a direction perpendicular to the direction of lateral deviation of the images, and reference numerals 53 and 54 designate focus indicating parts having a construction in which the focus indicating parts 55 and 56 have been rotated through 90° with respect to the center axis, and these latter parts cause deviation of the images in the vertical direction. If this embodiment is used, focus indication will be readily possible for linear images in any direction.

As has been described above, the focusing screen of the present invention has focus indicating parts comprising a diffraction grating structure formed on a split-image type prism, each unit structure of the diffraction grating structure having at least a portion thereof formed by a smooth curved surface, whereby the focusing screen achieves excellent effects that focus indication is possible without the focus indicating parts being completely darkened even for a lens having a wide range of F-number and that during out-of-focus, split images are adequately blurred to facilitate focus indication.

What I claim is:

1. In a split image type range finder system having an objective lens for forming an image plane, a focusing screen comprising:
   a plurality of light deflecting portions each of which includes:
   (a) a prism component having a light deflecting function for providing part of an out-of-focus image with displacement in one direction; and
   (b) a diffraction grating component formed on said prism component and having a plurality of unit structures, at least a portion of each of said plurality of structures being formed by a curved surface.

2. A focusing screen according to claim 1, wherein said diffraction grating component includes a relief and phase type diffraction grating.

3. A focusing screen according to claim 1, wherein said prism component includes a Fresnel prism.

4. A focusing screen according to claim 3, wherein each of said plurality of unit structures of said diffraction grating component is mounted on a strip portion of said Fresnel prism.

* * * * *